INVENTOR.
THOMAS D. COE

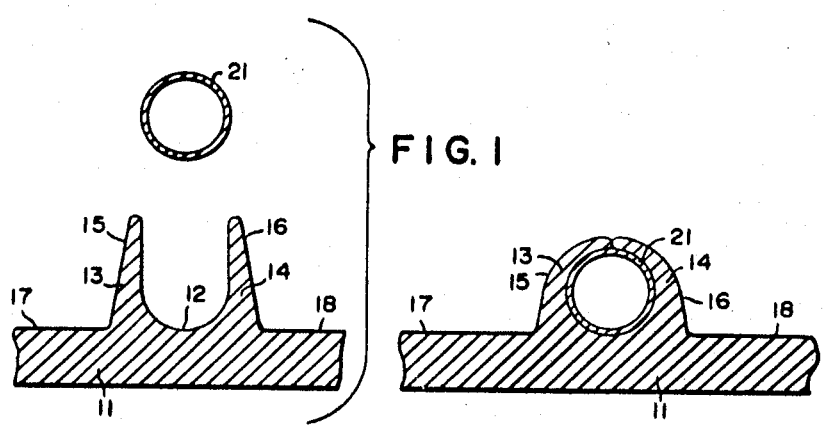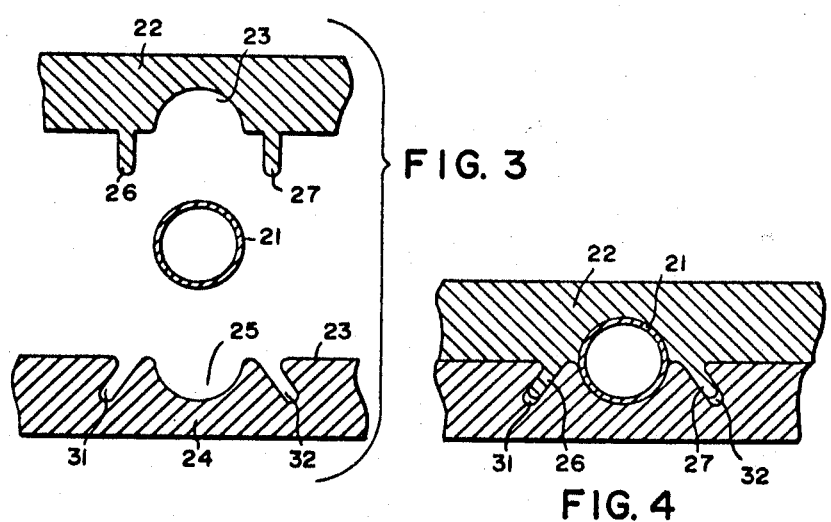

United States Patent Office 3,448,798
Patented June 10, 1969

3,448,798
HEAT TRANSFER APPARATUS
Thomas D. Coe, Winchester, Mass., assignor to Wakefield Engineering, Inc., Wakefield, Mass., a corporation of Massachusetts
Original application Jan. 26, 1967, Ser. No. 611,948, now Patent No. 3,387,653, dated June 11, 1968. Divided and this application Jan. 26, 1968, Ser. No. 718,965
Int. Cl. F28f 3/12, 1/14, 21/00
U.S. Cl. 165—168                    4 Claims

ABSTRACT OF THE DISCLOSURE

A heating or cooling element of circular cross section, such as a tube, locked in a groove of generally U-shaped cross section. Like sections having a number of generally parallel fins terminating in ends of generally circular cross section alternating with generally parallel U-shaped grooves may be interlocked to form a cooler.

---

This application is a division of application Ser. No. 611,948 filed Jan. 26, 1967, now patent No. 3,387,653 granted June 11, 1968.

Background of the invention

The present invention relates in general to heat transfer apparatus and more particularly concerns novel apparatus and techniques for effecting efficient heat transfer through the utilization of extruded heat transfer elements.

Summary of the invention

According to the invention, there is first means defining a surface of high thermal conductivity formed with a generally U-shaped groove for accommodating a heating or cooling element of cross section suitable for force fitting in the latter groove with the latter element being lodged within the groove.

According to one aspect of the invention the legs of the means defining the U-shaped cross section are urged together to substantially surround and snugly engage the element of such cross section.

According to another aspect of the invention there is second means defining a second surface of high thermal conductivity formed with a generally U-shaped groove coacting with the U-shaped groove in the first means to completely surround the element of such cross section. Preferably, one of the surfaces is initially extruded with a pair of ridges extending generally perpendicularly from the surface on opposite sides of the U-shaped groove while the other surface is formed with angularly oriented mating recesses on opposite side of the U-shaped groove so that when the two surfaces are urged together completely surrounding the element of generally circular cross section, the ridges are bent from their perpendicular position as they slide into the mating angular grooves to firmly lock the surfaces around the element of such cross section.

In still another form of the invention the first means is formed with a plurality of said generally U-shaped grooves alternating with a plurality of fins each terminating in an element of substantially such cross section so that a pair of such means may be locked together with the terminating element of each fin lodged in an opposed U-shaped groove of the other such means. The resultant structure may then have twice as many fins as could be practically made from a single extrusion alone.

Numerous other features, objects and advantages of the invention will become apparent from the following specification when read in connection with the accompanying drawing in which:

Brief description of the drawing

FIG. 1 is a sectional view through a surface of high thermal conductivity formed with a U-shaped groove according to the invention immediately below a hollow tube of material of high thermal conductivity adapted to fit in the U-shaped groove prior to insertion of the former into the latter;

FIG. 2 is a sectional view of the elements of FIG. 1, but with the hollow tube snugly engaged in the U-shaped groove with the legs bent over to hold the tube snugly in place;

FIG. 3 is a sectional view showing another embodiment of the invention in which a pair of surfaces of high thermal conductivity are formed with U-shaped grooves of semicircular cross section with a pair of opposed ridges in one and a pair of angularly oriented mating grooves in the other prior to engagement in surrounding relationship about the hollow tube of thermally conductive material;

FIG. 4 is a sectional view of the elements of FIG. 3, but with the different elements locked together in good thermal and mechanical contact;

Detailed description of the preferred embodiments

Figure 5:
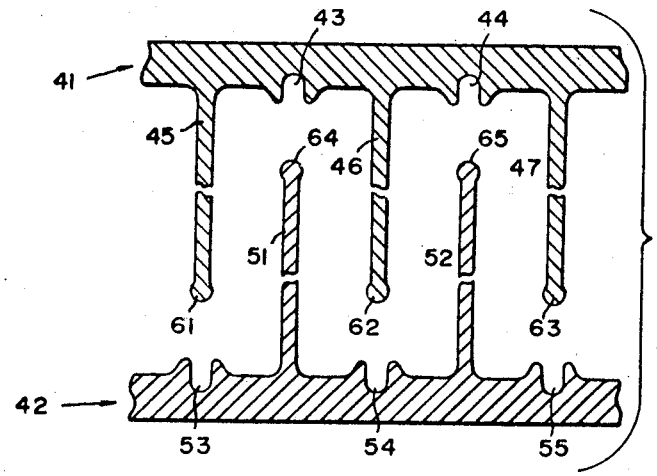
FIG. 5 is a sectional view of still another embodiment of the invention in which U-shaped grooves alternate with fins formed with an end element of generally circular cross section adapted to be seated in respective opposed U-shaped grooves in the illustrated opposed like element.

With reference now to the drawing and more particularly FIG. 1 thereof, there is shown a sectional view of an extrusion according to the invention and a sectional view through a tube of material of high thermal conductivity adapted to be seated in the U-shaped groove. Since the invention is directed to elements of essentially constant cross section in preferred embodiments, the drawing shows only sectional views thereof to more clearly illustrate the principles of the invention. Referring more specifically to FIG. 1, there is shown a sectional view of a portion of an extrusion made of material of high thermal conductivity, typically aluminum, in which the surface 11 is formed with a U-shaped groove 12 defined by legs 13 and 14 extending generally perpendicular to the surface 11 although it is seen that the outside surfaces 15 and 16 of legs 13 and 14 form an obtuse angle with the portions 17 and 18 of the surface 11. The separation between legs 15 and 16 and the radius of the essentially semicircular groove corresponds substantially to the outer diameter of the hollow tube 21 made of material of high thermal conductivity, typically aluminum. The conducting surface 11 typically comprises a number of like extrusions capable of accommodating a like number of generally parallel conducting tubes like 21 with adjacent tubes interconnected by U-shaped portions to define an accordion-shaped coolant tube for guiding coolant over the surface 11 so that the surface 11 coacts with the hollow tube 21 and the coolant therein to transfer heat between the coolant and the air or other coolant in contact with the large surface area of surface 11. Since the actual form of the cooling tubes is of the same form as heat exchanger coils in common use, this form is not further described or specifically illustrated herein.

Referring to FIG. 2, there is shown a sectional view of tube 21 seated in U-shaped groove with legs 13 and 14 snugly surrounding tube 21. The resultant structure thus establishes good thermal and mechanical contact between tube 21 and surface 11 to insure maximum heat transfer between the surrounding coolant and the electronic components, to which surface 11 is exposed.

Referring to FIG. 3, there is shown another embodiment of the invention in which there are two extruded surfaces. An upper surface 22 is formed with a semicircular U-shaped groove 23, and a lower surface 24 is formed with a semicircular U-shaped groove 25. In addition upper surface 22 is extruded with a pair of vertically extending ridges 26 and 27 extending generally perpendicular to surface 22 and separated by groove 23 while lower surface 24 is formed with a pair of recesses 31 and 32 that are angularly oriented with respect to the surface 24 as shown, preferably extending away from the top surface 33 and the U-shaped groove 25. The separation between the openings of recesses 31 and 32 at the top surface 33 is substantially the same as the separation between ridges 26 and 27 with the U-shaped grooves 23 and 25 centered as shown. When surfaces 22 and 24 are urged together, ridges 26 and 27 enter recesses 31 and 32 and are bent apart as U-shaped grooves 23 and 25 snugly surround tube 21 to achieve the position shown in FIG. 4. The radius of U-shaped grooves 23 and 25 is substantially the same as the radius of conducting tube 21.

Figure 6:
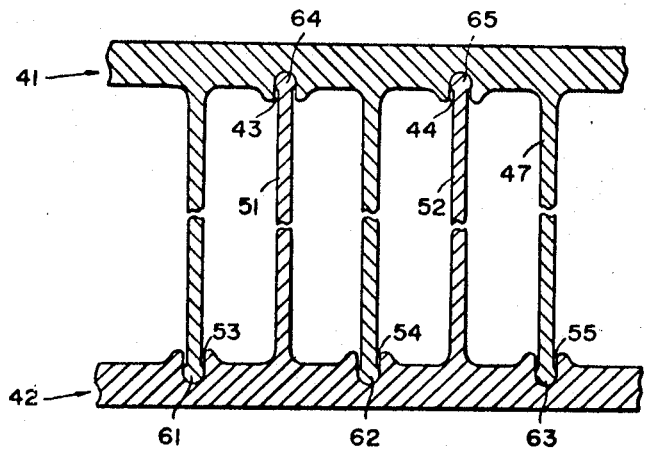
FIG. 6 is a sectional view of the elements in FIG. 5 showing a pair of like elements brought together with the fin ends of generally circular cross section seated in an opposed U-shaped groove.

Referring to FIG. 5, there is shown still another embodiment of the invention in which like extrusions are locked together to double the number of fins for cooling practically available from a single extrusion. Extrusions 41 and 42 are alike, a portion of extrusion 41 being shown having U-shaped grooves 43 and 44 interlaced among three fins 45, 46 and 47. A portion of extrusion 42 is shown having two fins 51 and 52 interlaced among three U-shaped grooves 53, 54 and 55. Each of fins 45, 46, 47, 51 and 52 are formed with ends 61, 62, 63, 64 and 65, respectively, of generally circular cross section of diameter corresponding substantially to the width of the U-shaped grooves 43, 44, 53, 54 and 55 for snug accommodation in a respective opposed groove as shown in FIG. 6 so that the two like elements forming the heat sink of FIG. 6 may be firmly held together. An important advantage of the invention is that the fins of the nearly assembled package shown in FIG. 6 may have a length relative to the fin thickness and spacing between fins so great that a single extrusion would be impractical to achieve. The extrusion in two parts is, however, practical and actually achieved so that actual cooling packages have been constructed of aluminum in which the length of each fin was 3 inches; the thickness of each fin, .06 inch; the separation between fins in the finished package, .31 inch, and the thickness of each base plate from which the fins extend, .20 inch. Extrusions with 5 and 10 fins before mating have been constructed yielding assemblies with 10 and 20 fins, respectively.

The nearly finished package of FIG. 6 may be used for convection cooling or may be arranged to have air or other fluids forced through the chambers between adjacent fins to provide exceptionally efficient cooling.

Figure 7:
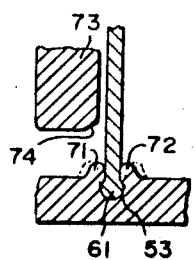
FIG. 7 shows how hardened steel blades may be used to urge the extremities of the legs of the U-shaped cross sections together and thereby lock the two like halves together in good mechanical and thermal contact.

Referring to FIG. 7, there is shown a view of a typical finished connection between an end, such as 61, of circular cross section and a U-shaped groove, such as 53, in which the ends of the legs, such as 71 and 72, are urged together so that the U-shaped groove engages an end portion of circular cross section that is greater than 180 degrees. This urging together is typically effected by using a hardened steel blade, such as 73, having a beveled side 74 that urges a leg end such as 71 toward leg end 72 as the hardened steel blade 73 is moved toward the center of the circular cross section of end 61.

The specific positions for attaching devices to be cooled have not been illustrated and described above, such means for attaching being well known to those skilled in the heat exchanging art. For example, semiconductor devices to be cooled may be affixed to any of the horizontal surfaces illustrated in FIGS. 1–6 in good thermal contact therewith.

There have been described efficient, relatively inexpensive and relatively easy-to-fabricate heat exchanging apparatus. It is evident that those skilled in the art may now make numerous modifications and uses of and departures from the specific embodiments and techniques disclosed herein without departing from the inventive concepts. Consequently, the invention is to be construed as embracing each and every novel feature and novel combination of features present in or possessed by the apparatus and techniques disclosed herein and limited solely by the spirit and scope of the appended claims.

What is claimed is:
1. Heat transfer apparatus comprising,
first means defining a surface of high thermal conductivity formed with a groove of generally U-shaped cross section,
means defining an element of high thermal conductivity and of cross section suitable for accommodation within said groove,
means defining a second surface of high thermal conductivity formed with a portion of generally U-shaped cross section for coacting with said U-shaped groove to completely surround said element cross section,
one of said surfaces comprising means initially extruded with a pair of ridges extending generally perpendicularly from said one surface on opposite sides of the U-shaped groove while the other surface is formed with angularly oriented mating recesses on opposite sides of the U-shaped groove, the two surfaces being urged together to completely surround said element cross section, said ridges being bent from their perpendicular position as they slide into said mating angular grooves to firmly lock said surfaces around said element.

2. Heat transfer apparatus in accordance with claim 1 wherein said element is hollow.

3. Heat transfer apparatus in accordance with claim 2 wherein said element cross section is substantially circular.

4. Heat transfer apparatus in accordance with claim 3 wherein said terminating elements are of substantially circular cross section.

References Cited

UNITED STATES PATENTS

| | | | |
|---|---|---|---|
| 2,687,626 | 8/1954 | Bartlowe | 165—171 X |
| 2,867,417 | 1/1959 | Axlander | 165—171 X |
| 2,944,138 | 7/1960 | Goff | 165—183 X |
| 2,987,300 | 6/1961 | Greene | 165—171 X |

FOREIGN PATENTS

| | | |
|---|---|---|
| 499,568 | 1/1954 | Canada. |
| 1,123,647 | 2/1962 | Germany. |

ROBERT A. O'LEARY, Primary Examiner.

ALBERT W. DAVIS, Assistant Examiner.

U.S. Cl. X.R.

29—157.3; 165—170, 180, 183